(12) United States Patent
Farh et al.

(10) Patent No.: US 10,509,795 B2
(45) Date of Patent: Dec. 17, 2019

(54) SEMANTIC DISTANCE SYSTEMS AND METHODS FOR DETERMINING RELATED ONTOLOGICAL DATA

(71) Applicant: ILLUMINA, INC., San Diego, CA (US)

(72) Inventors: Kai-How Farh, San Mateo, CA (US); Jorg Hakenberg, Foster City, CA (US); Milan Karangutkar, Santa Clara, CA (US); Wenwu Cui, Cupertino, CA (US); Hong Gao, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 249 days.

(21) Appl. No.: 15/683,721

(22) Filed: Aug. 22, 2017

(65) Prior Publication Data
US 2018/0060401 A1 Mar. 1, 2018

Related U.S. Application Data

(60) Provisional application No. 62/378,673, filed on Aug. 23, 2016.

(51) Int. Cl.
*G06F 7/00* (2006.01)
*G06F 17/30* (2006.01)
(Continued)

(52) U.S. Cl.
CPC .............. *G06F 16/248* (2019.01); *G06F 7/02* (2013.01); *G06F 16/24575* (2019.01); *G06F 16/367* (2019.01)

(58) Field of Classification Search
CPC .................. G06F 16/248; G06F 16/367; G06F 16/24575; G06F 7/02; G06F 17/30
See application file for complete search history.

(56) References Cited

U.S. PATENT DOCUMENTS

| | | | | |
|---|---|---|---|---|
| 8,229,881 B2 * | 7/2012 | Pedro | ................... | G06F 16/367 |
| | | | | 707/600 |
| 2014/0365494 A1 * | 12/2014 | Gangavaram | ......... | G06F 16/245 |
| | | | | 707/739 |

FOREIGN PATENT DOCUMENTS

WO 2016128415 A1 8/2016

OTHER PUBLICATIONS

Dean, J. et al., "MapReduce: Simplified Data Processing on Large Clusters", OSDI'04 Proceedings of the 6th conference on Symposium on Operating Systems Design & Implementation, 2004, 2004.
(Continued)

*Primary Examiner* — Azam M Cheema
(74) *Attorney, Agent, or Firm* — Illumina, Inc.

(57) ABSTRACT

Systems, computer-implemented methods, and non-transitory computer readable media are provided for determining related ontological data. The disclosed systems may be configured to receive a first ontology and a second ontology, the first ontology and the second ontology comprising hierarchically organized ontological data. The disclosed systems may also be configured to receive an indication that a first ontological datum in the first ontology is equivalent to a second ontological datum in the second ontology, and a query for ontological data related to a third ontological datum subordinate to the first ontological datum. The disclosed systems may be configured to determine a first semantic distance between the third ontological datum and a fourth ontological datum in the second ontology satisfies a semantic distance criterion, and output the fourth ontological datum based on the determination that the first semantic distance satisfies the semantic distance criterion.

21 Claims, 12 Drawing Sheets

(51) Int. Cl.
*G06F 16/248* (2019.01)
*G06F 16/2457* (2019.01)
*G06F 16/36* (2019.01)
*G06F 7/02* (2006.01)

(56) References Cited

OTHER PUBLICATIONS

Zaharia, M. et al., "Spark: Cluster Computing with Working Sets", Proceedings of the 2nd USENIX Conference on Hot Topics in Cloud Computing, 2010, 2010.

Zhong, N. , "Representation and Construction of Ontologies for Web Intelligence", International Journal of Foundations of Computer Science vol. 13 (4), 2002, 555-570.

\* cited by examiner

SEMANTIC DISTANCE SYSTEMS AND METHODS FOR DETERMINING RELATED ONTOLOGICAL DATA

CROSS-REFERENCE TO RELATED APPLICATIONS

This application claims priority to U.S. Provisional Patent Application No. 62/378,673, filed Aug. 23, 2016, which is hereby incorporated by reference herein in its entirety.

TECHNICAL FIELD

The disclosed systems and method generally concern computerized systems for relating ontologies in a manner that facilitates the retrieval of ontological data. More specifically, the disclosed systems and method concern determination of semantic distances between ontological data in separate ontologies.

SUMMARY

The disclosed systems and methods may enable determination of related ontological data across ontologies. This may facilitate searches for related concepts in heterogeneous data sources. This may also enable the automated combination of different standard ontologies, and the combination of such standard ontologies with custom ontologies adapted to specific conceptual fields.

The disclosed embodiments may include a system for retrieving related ontological data. A system for retrieving related ontological data can include at least one processor of an analysis system; and at least one non-transitory memory of the analysis system, the at least one non-transitory memory storing instructions that, when executed by the at least one processor, cause the analysis system to perform operations comprising providing a first ontology of medical-related data and a second ontology of medical-related data, the first ontology and the second ontology each including a plurality of levels of hierarchically organized ontological data.

The operations can include precomputing mappings of similarity between all terms in the first ontology and all terms in the second ontology by a function that relates depth and density of the first and the second ontologies, the precomputed mappings having semantic distances between each of the terms of the first and second ontologies.

The operations can include receiving a query for medical-related ontological data related to ontological data in the first ontology, the query comprising a query term. The operations can include calculating in real-time all terms in the first and second ontologies that fall within a predetermined semantic distance criterion of the query term. The operations can include outputting the calculated terms of the first and second ontologies that fall within the predetermined semantic distance criterion.

This system may include at least one processor of an analysis system, and at least one non-transitory memory of the analysis system. The at least one non-transitory memory may store instructions that, when executed by the at least one processor, cause the analysis system to perform operations. The operations may include receiving a first ontology and a second ontology, the first ontology and the second ontology comprising hierarchically organized ontological data. The operations may also include receiving an indication that a first ontological datum in the first ontology is equivalent to a second ontological datum in the second ontology. The operations may additionally include receiving a query for ontological data related to a third ontological datum in the first ontology, the third ontological datum subordinate to the first ontological datum. The operations may include determining a first semantic distance between the third ontological datum and a fourth ontological datum in the second ontology satisfies a semantic distance criterion. The fourth ontological datum may be subordinate to the second ontological datum. The first semantic distance may depend on a second semantic distance between the third ontological datum and the first ontological datum, and a third semantic distance between the fourth ontological datum and the first ontological datum. And the operations may include outputting the fourth ontological datum based on the determination that the first semantic distance satisfies the semantic distance criterion.

In some aspects, the query may include the semantic distance criterion. In various aspects, determining the first semantic distance satisfies the semantic distance criterion may include accessing a database of predetermined semantic distances, retrieving the first semantic distance, and comparing the first semantic distance to the semantic distance criterion. In some aspects, determining the first semantic distance satisfies the semantic distance criterion may include determining the first ontological datum and the second ontological datum as the nearest common ancestors of the third ontological datum and the fourth ontological datum. In various aspects, the second semantic distance may depend on a depth of the third ontological datum.

In some aspects, the second semantic distance depends on a normalization factor specific to the first ontology. This normalization factor may comprise an average depth of the first ontology. In various aspects, the second semantic distance may depend on a sibling rank of the third ontological datum.

The disclosed embodiments may include a system for determining semantic distances. The system may include at least one processor of an analysis system, and at least one non-transitory memory of the analysis system. The at least one non-transitory memory may contain instructions that, when executed by the at least one processor, cause the analysis system to perform operations. The operations may include receiving a first ontology and a second ontology. The first ontology and the second ontology may include hierarchically organized ontological data. The operations may include receiving an indication that a first ontological datum in the first ontology is equivalent to a second ontological datum in the second ontology, and determining a first semantic distance between the first ontological datum and a third ontological datum. The third ontological datum may be subordinate to the first ontological datum. The operations may include determining a second semantic distance between the second ontological datum and a fourth ontological datum. The fourth ontological datum may be subordinate to the second ontological datum. The operations may include determining, using the first semantic distance and the second semantic distance, a third semantic distance between the third ontological datum and the fourth ontological datum. And the operations may include outputting the third semantic distance.

In some aspects, the instructions may further cause the analysis system to determine the first ontological datum and the second ontological datum as the nearest common ancestors of the third ontological datum and the fourth ontological datum. In various aspects, the instructions may further cause the analysis system to update the first ontology before determining the first semantic distance by removing at least one ontological datum and all superiors to the at least one removed ontological datum. In some aspects, the first semantic distance may depend on a depth of the third ontological datum. In various aspects, the first semantic distance may depend on a normalization factor specific to the first ontology. The normalization factor may comprise an average depth of the first ontology. In some aspects, the first semantic distance may depend on a sibling rank of the third ontological datum.

The disclosed embodiments may include a non-transitory computer readable media containing instructions. When executed by at least one processor of a system, the instructions may cause the system to perform operations. The operations may include receiving a first ontology and a second ontology, the first ontology and the second ontology comprising hierarchically organized ontological data. The operations may include receiving an indication that a first ontological datum in the first ontology is equivalent to a second ontological datum in the second ontology. The operations may include receiving a query for ontological data related to a third ontological datum in the first ontology. The third ontological datum may be subordinate to the first ontological datum. The operations may include determining a first semantic distance between the third ontological datum and a fourth ontological datum in the second ontology satisfies a semantic distance criterion. The fourth ontological datum may be subordinate to the second ontological datum. The first semantic distance may depend on a second semantic distance between the third ontological datum and the first ontological datum and a third semantic distance between the fourth ontological datum and the first ontological datum. The second semantic distance may depend on a depth of the third ontological datum. And the operations may include outputting the fourth ontological datum based on the determination that the first semantic distance satisfies the semantic distance criterion.

In some aspects, the query may include the semantic distance criterion. In various aspects determining the first semantic distance satisfies the semantic distance criterion may include accessing a database of predetermined semantic distances, retrieving the first semantic distance, and comparing the first semantic distance to the semantic distance criterion. In some aspects, the second semantic distance may depend on a normalization factor specific to the first ontology, the normalization factor comprising an average depth of the first ontology. In various aspects, the second semantic distance may depend on a sibling rank of the third ontological datum.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
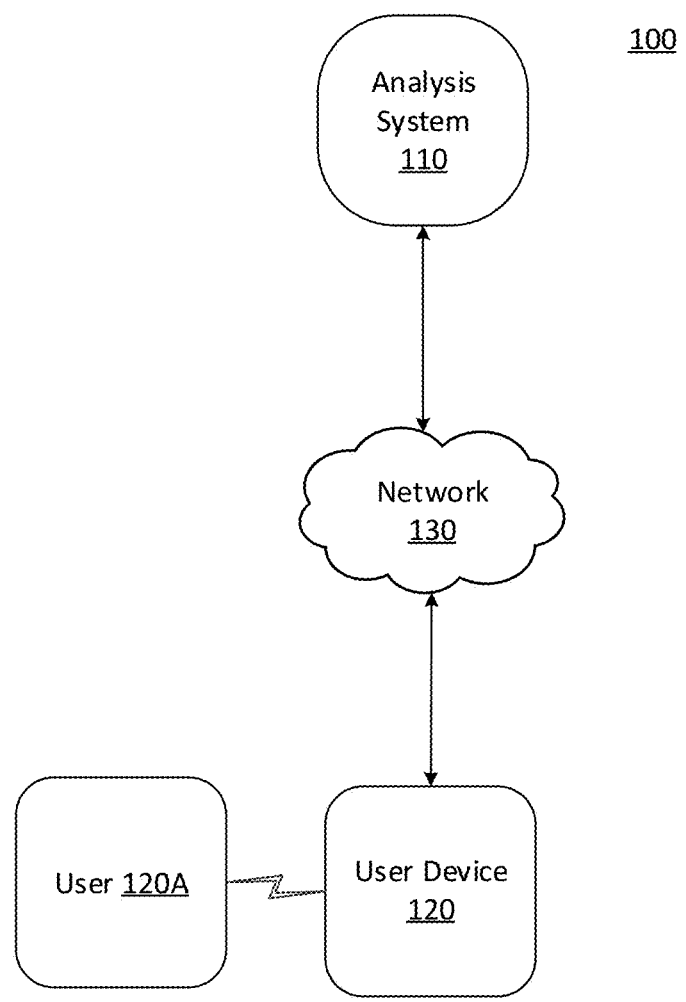
FIG. 1 depicts a schematic of a system for generating semantic distances from ontological data, according to an embodiment of the invention.

Reference will now be made in detail to the disclosed embodiments, examples of which are illustrated in the accompanying drawings. Wherever convenient, the same reference numbers will be used throughout the drawings to refer to the same or like parts.

As used herein, an ontology may be a representation of a field of discourse, describing data in the field of discourse. An ontology may be defined by formal rules, and computing devices may be configured to use the ontology according to these formal rules. An ontology may include definitions of the entities. These definitions may include commonly accepted definitions and descriptions of data, properties of data, and interrelationships of data. The data may be hierarchically organized, as shown below with regard to FIG. 2. For example, the ontology may be represented by an acyclic graph or taxonomy, such as a tree or a forest. Entities in the acyclic graph or taxonomy may have multiple parent elements and multiple child elements. Non-limiting examples of ontologies include SNOMED Clinical Terms, a collection of medical terms used in clinical documentation and reporting; RxNorm, a terminology of medications; Online Mendelian Inheritance in Man (OMIM), a catalog of genes and genetic disorders; Logical Observation Identifiers Names and Codes (LOINC), a standardized database for identifying medical laboratory observations; International Classification of Diseases, V9 (ICD9-CM), a system of diagnostic codes for classifying diseases; and the UMLS Metathesaurus, a compendium of biomedical concepts.

A system for retrieving related ontological data can include at least one processor of an analysis system; and at least one non-transitory memory of the analysis system, the at least one non-transitory memory storing instructions that, when executed by the at least one processor, cause the analysis system to perform operations. These operations can include providing a first ontology of medical-related data and a second ontology of medical-related data, the first ontology and the second ontology each comprising a plurality of levels of hierarchically organized ontological data.

Examples of the first and second ontologies will be provided below. Different ontologies with different nomenclatures and even different spellings are contemplated being used and analyzed according to the broad inventive principles disclosed herein. For example, a research institute in England can use an ontology that includes data having a first degree of granularity that goes into detail about particular phenotypes and uses British American English. On the other hand, a hospital system or insurance company may use billing codes or groups of therapies that are more general than the first degree of granularity used by the British research institution. The hospital system and/or insurance company in America can internally use more general phenotypes to abstract phenotypes for one or more diseases. On top of this, it can use naming conventions stored in American English. To reconcile differences between the two, while at the same time preserving completeness and inclusiveness of data, the interface layer can translate on the backend equivalencies between terms by matching up equivalent terms across different ontologies. According to embodiments, this British research institution can enter a phenotype for searching according to British spelling of names and receive results in American English, for example, which can abstract any ontological differences to terms stored. In this manner, the search results and connections can expansively include terms that otherwise would not identically show up.

Signs 310, evidences 320, and/or associations 330 for one ontology or datastore may be associated with a specific language or terminology that is different, but equivalent to signs 310, evidences 320, and/or associations 330 for another ontology or datastore. Thus, one ontology a research organization having a British spelling for terms can be included in the federated system for comparison with another ontology having an American spelling of terms. A user with a preference set to a particular language or with a predominant knowledgebase of a particular language can input search terms in the federated search according to one language. Another parameter can be a particular level of generality for a term, such as a billing code for a hospital or insurance company that is more generic than a phenotype or disease that could be used by a research or clinical organization. The term can be compared for equivalent although not identical terms in other ontologies. Matches that satisfy the particular query can be returned in the equivalent language of the user even if it differs from the corresponding term in the federated system.

As used herein, semantic distance is the degree of relatedness between concepts. This degree of relatedness may be comparative. For example, the semantic distance between "sovereign" and "emperor" may be less than the semantic distance between "sovereign" and "vassal." Similarly, the semantic distance between the IDC-9 code "dislocation of wrist" and the IDC-9 code "dislocation of finger" may be less than the semantic distance between the IDC-9 code for "dislocation of wrist" and the IDC-9 code for "Fracture of radius and ulna," while the semantic distance between the IDC-9 code for "dislocation of wrist" and the IDC-9 code for "Fracture of radius and ulna" may be less than the semantic distance between the IDC-9 code for "dislocation of wrist" and the IDC-9 code for "Malignant neoplasm of short bones of upper limb." A semantic distance may be estimated by using ontologies, consistent with disclosed embodiments.

For example, the semantic distance between two entities in an ontology may be the shortest distance along a path linking the two entities. In some aspects, the semantic distance may be a number, such as a natural number or a rational number. Such a number may be stored in a non-transitory computer memory, consistent with disclosed embodiments.

FIG. 1 depicts an exemplary schematic of a system for generating semantic distances from ontological data, consistent with disclosed embodiments. Analysis system 110 may be configured to receive ontologies, and may be configured to calculate semantic distances between data in the ontologies. Analysis system 110 may be configured to receive a query from user device 120. In response to this query, in some embodiments, analysis system 110 may be configured to provide at least one ontological datum based on the calculated semantic distances. In various embodiments, analysis system 110 may be configured to provide the at least some of the calculated semantic distances to user device 120.

Analysis system 110 may comprise one or more computing systems. An exemplary component of analysis system 110 is described below with respect to FIG. 7A. In some embodiments, analysis system 110 may comprise a parallel computing environment. In some aspects, this parallel computing environment may be implemented according to the MapReduce architecture described in "MapReduce: Simplified Data Processing on Large Clusters," by Jeffrey Dean and Sanjay Ghemawat (OSDI'04 Proceedings of the 6th conference on Symposium on Operating Systems Design & Implementation, 2004), incorporated herein by reference in its entirety. In various aspects, this parallel computing environment may be implemented according to the Spark architecture described in "Spark: Cluster Computing with Working Sets," by Matei Zaharia, Mosharaf Chowdhury, Michael J. Franklin, Scott Shenker, and Ion Stoica (Proceedings of the 2nd USENIX Conference on Hot Topics in Cloud Computing, 2010), incorporated herein by reference in its entirety. As would be recognized by one of skill in the art, these implementations are intended to be exemplary, and not limiting. In various embodiments, analysis system 110 may be implemented using one or more computing clusters, servers, workstations, desktops, or laptops. In some embodiments, analysis system 110 may be implemented using a cloud-based computing environment. In some embodiments, analysis system 110 may be configured to determine semantic distances between ontological data. The ontological data may be organized in two or more ontologies. Analysis system 110 may be configured to receive the ontological data from another component of system 100, such as user device 120, or another system.

User device 120 may comprise a computing system configured to communicate with the other components of system 100, or another system. An exemplary component of user device 120 is described below with respect to FIG. 6A. User device 120 may be configured to send or receive data or instructions from analysis system 110, for example using network 130. In some embodiments, user device 120 may operate as a client of another component of system 100. User device 120 may include, but is not limited to, one or more servers, workstations, desktops, or mobile computing devices (e.g., laptops, tablets, phablets, or smart phones). User device 120 may be configured to enable interaction with user 120A. In some aspects, user device 120 may provide a graphical user interface for displaying information. The displayed information may be received by user device 120, or may be generated by user device 120. For example, the displayed information may include the at least one ontological datum provided by the analysis system. As an additional example, the displayed information may include at least one of the calculated semantic distances.

Consistent with disclosed embodiments, user 120A may interact with user device 120 to use system 100. In some embodiments, user 120A may interact with user device 120 to provide to analysis system 110 at least one of an ontology and a query. The ontology may comprise a representation of a field of discourse, as described above. The query may include at least one ontological datum. The query may also include a semantic distance criterion. For example, the query may restrict results to ontological data within the predetermined semantic distance of the provided at least one ontological datum. The query may direct analysis system 110 to provide the result to user device 120, or another system.

Network 130 may be configured to provide communications between components of FIG. 1. For example, network 130 may be any type of network (including infrastructure) that provides communications, exchanges information, and/or facilitates the exchange of information, such as the Internet, a Local Area Network, or other suitable connection(s) that enables system 100 to send and receive information between the components of system 100, between the components of system 100 and other systems, and between system 100 and other systems.

Figure 2:
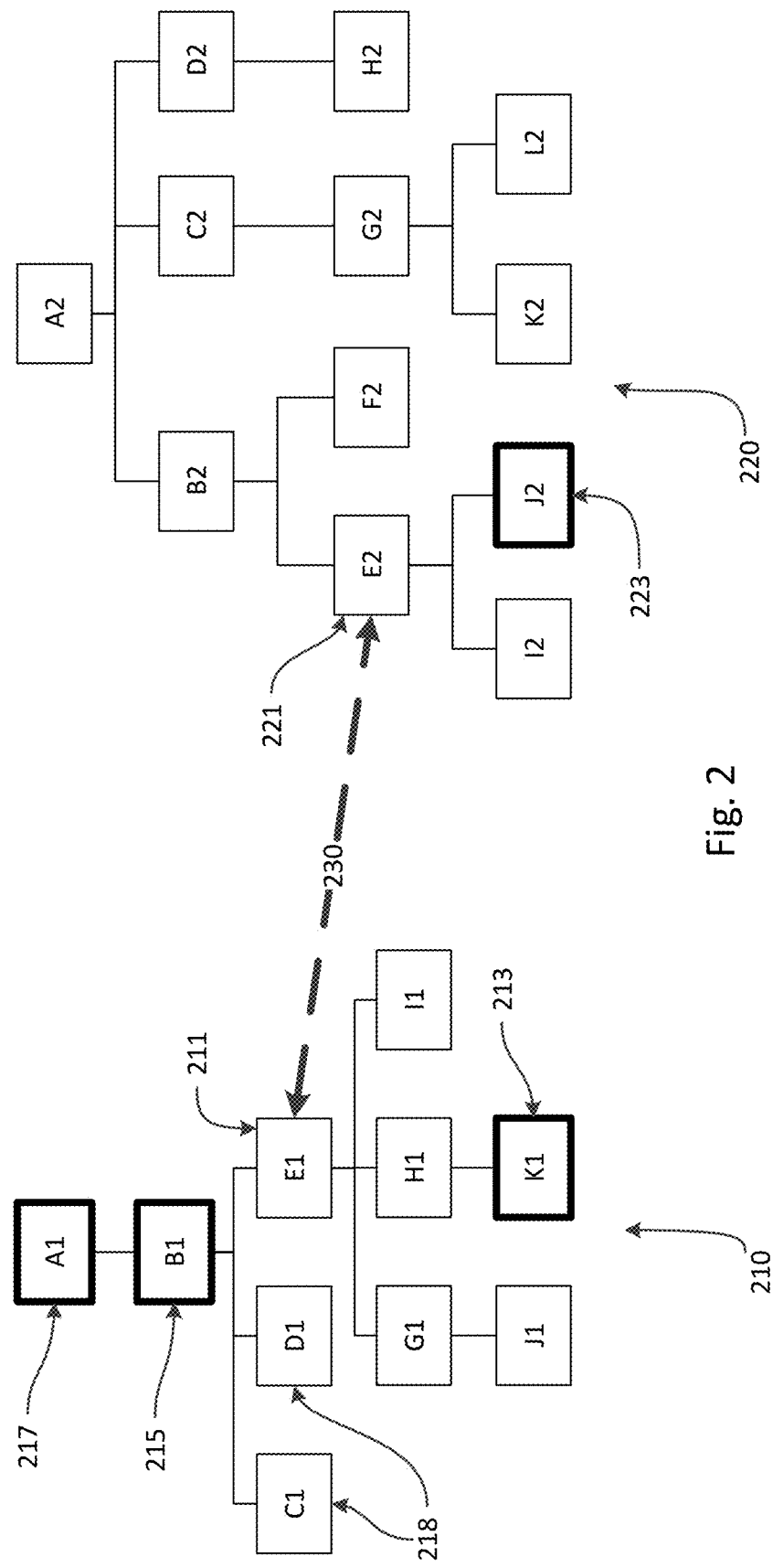
FIG. 2 depicts an illustration of relationships between ontologies, according to an embodiment of the invention.

FIG. 2 depicts an exemplary illustration of relationships between ontologies, consistent with disclosed embodiments. As shown in this figure, ontology 210 may comprise ontological data, such as ontological datum 211, ontological datum 213, ontological datum 215, and ontological datum 217. Ontology 210 may describe the interrelationships of this ontological data. In some aspects, these interrelationships may be hierarchical. For example, the connections shown in FIG. 2 may indicate subsumption relationships, where an ontological datum at a first level implies a subordinate ontological datum at a second level. For example, ontological datum 215 may be a subclass of ontological datum 217. Ontology 220 may also comprise ontological data, such as ontological datum 221, and ontological datum 223. Ontology 220 may also describe the interrelationships of this ontological data, for example by indicating subsumption relationships between ontological data. Ontology 220 and ontology 210 may comprise data and/or instructions stored in a non-transitory memory.

Equivalence 230 may define an equivalence between ontological datum 211 of ontology 210 and ontological datum 221 of ontology 220. Equivalence 230 may be stored as data and/or instructions in a non-transitory memory. Equivalence 230 may indicate a predetermined semantic distance between ontology 210 and ontological datum 221. This predetermined semantic distance may be zero, or may be a non-zero value. This predetermined semantic distance may depend on at least one of ontology 210, ontology 220, ontological datum 211, and ontological datum 221. For example, a predetermined value may be assigned to equivalences between ontology 210 and other ontologies, equivalences between ontology 210 and ontology 220, or equivalences between ontological datum 211, and ontological datum 221. Other predetermined values may be assigned to other equivalences. In some aspects, equivalence 230 may be machine-readable—a computing device processing ontology 210 and ontology 220 may be configured to recognize equivalence 230 when determining semantic differences between entities in ontologies.

The operations of the disclosed systems and methods can include receiving a query for medical-related ontological data related to ontological data in the first ontology, the query comprising a query term.

Figure 3:
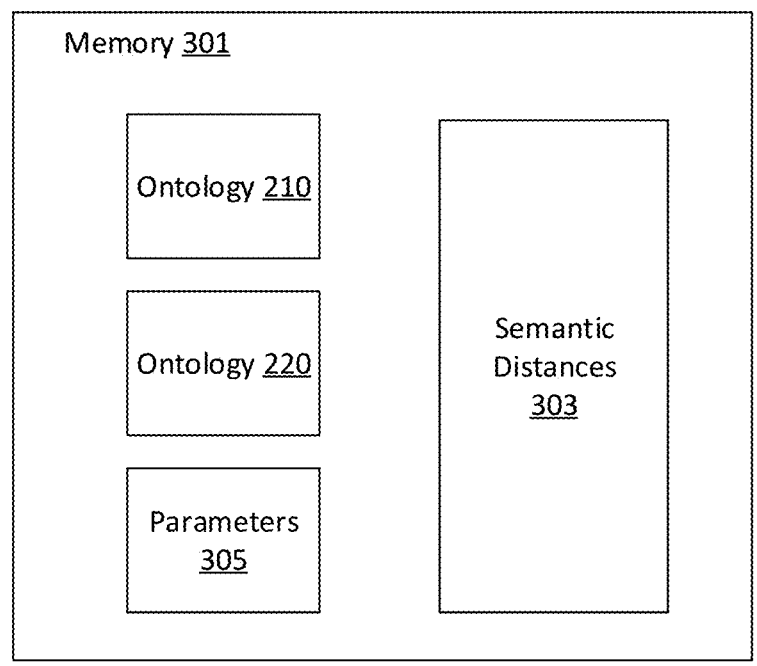
FIG. 3 depicts a logical model of a non-transitory memory storing data and operations for determining semantic distances, according to an embodiment of the invention.

FIG. 3 depicts a logical model of a non-transitory memory 301 storing data and operations for determining semantic distances, consistent with disclosed embodiments. In some embodiments, analysis system 110 may be configured to access memory 301 when determining semantic distances. In some aspects, analysis system 110 may include memory 301. Memory 301 may be configured to store ontologies (e.g., ontology 210 and ontology 220), semantic distances 303, and parameters 305. Ontologies may be stored in one or more data structures. As a non-limiting example, ontologies may be stored in memory 301 as records, trees, graphs, or lists. One of skill in the art would recognize other possibilities, and the enumerated examples are not intended to be limiting.

Semantic distances 303 may comprise one or more data structures containing semantic distance information for ontologies, consistent with disclosed embodiments. In some aspects, semantic distances 303 may comprise semantic distances associated with pairs of ontological data. In some embodiments, for example, semantic distances 303 may include tuples comprising a first ontological datum (e.g., ontological datum 213), a second ontological datum (e.g., ontological datum 223), and an associated semantic distance. In some aspects, this associated semantic distance may be the semantic distance between the first ontological datum and the second ontological datum. In various aspects, this associated semantic distance may depend on the semantic distance between the first ontological datum and the second ontological datum. In various embodiments, as an additional example, semantic distances 303 may comprise one or more matrices. For example, semantic distances 303 may comprise a matrix with rows and columns corresponding to ontological data, and elements with values depending on the distance between the ontological datum corresponding to the row (e.g., ontological datum 213) and the ontological datum corresponding to the column (e.g., ontological datum 223). The one or more matrices may be implemented using at least one relational database. In some embodiments, semantic distances 303 may contain semantic distances between elements of different ontologies and between elements of the same ontology. As a non-limiting example, given ontology 210 and ontology 220, semantic distances 303 may contain semantic distances between ontological datum 215 and ontological datum 213, and between ontological datum 213 and ontological datum 223. The predetermined semantic distance criterion can be a distance equal to or less than a first semantic distance between the query term and at least one ontological datum of the first ontology and can be a distance equal to or less than a semantic distance between the query term and at least one ontological datum of the second ontology. The received query includes the predetermined semantic distance criterion.

Parameters 305 may comprise one or more parameters of system 100, consistent with disclosed embodiments. In some aspects, parameters 305 may comprise a distance criterion. The distance criterion may comprise data or instructions. The distance criterion may specify a necessary or sufficient degree of similarity between query items and related ontological data provided by system 100, as described below with regard to FIG. 5. In some aspects, parameters 305 may comprise normalization factors. The normalization factors may comprise data or instructions specific to ontologies. As described below with respect to FIG. 4, system 100 may be configured to use the normalization factors to adjust semantic distances. The distance criterion or relatedness threshold can be user-specified.

A slider can be implemented that allows for a user to explore patients that are federated across the planet. And if a very high distance is selected, many results are returned (thousands). However, a very high distance can be quite distant from the query used. The slider can be used to slide toward closer and closer distances, which in turn can result in fewer patients that are more and more related. In this manner, the API or front-end that sits on top of the API either can define that threshold themselves or let the user decide. For example, starting with a very strict query may result in very few or even no results. This means that the user may want to expand the threshold and risk getting into fairly distant phenotypes but at least finding some patients. Thus, a particular threshold distance can be user-driven depending on the specific preferences of the user. This relatedness index can be a float between 0-12. This relatedness index can depend on how deep the ontologies that are being searched through are (i.e., how deep is the ancestor and descendants of a particular ontology) or on how many ontological terms the federated system covers. For example, some ontologies can be relatively flat, having only three or four levels. Others, having leaf nodes or child ontological terms can be up to seventeen layers deep.

The at least one non-transitory memory can further include instructions that, when executed by at least one processor, cause the analysis system to perform normalizing the first semantic distance of the first ontology by a function of depth and density of the first ontology and normalizing the second semantic distance of the second ontology by a function of depth and density of the second ontology. The semantic distance threshold can be normalized between a scalable factor, say between 0 and 1 across all ontologies. Each of the normalized first and second semantic distances can be normalized by dividing the semantic distance of each respective ontology by the greatest distance times the total number of leaf nodes of the corresponding ontology.

Figure 4:
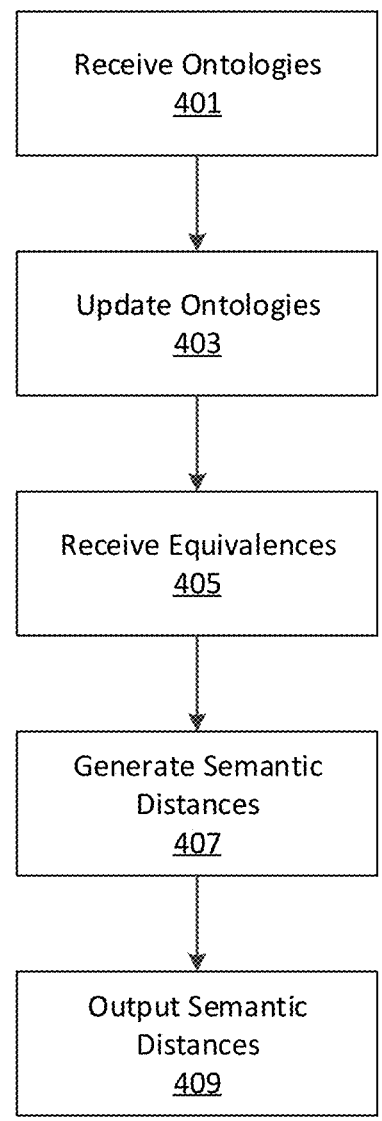
FIG. 4 depicts a flowchart of a method for generating semantic distances from ontological data, according to an embodiment of the invention.

FIG. 4 depicts an exemplary flowchart of a method for generating semantic distances from ontological data, consistent with disclosed embodiments. System 100 may be configured to receive ontologies in step 401. Receiving the ontologies may include retrieving at least one of the ontologies from a computer-readable medium, and/or generating at least one of the ontologies. In some aspects, analysis system 110 may be configured to receive the ontologies. Analysis system 110 may be configured to receive the ontologies from user device 120, or from another system. Analysis system 110 may be configured to store the ontologies in memory 301, or another memory. In some embodiments, analysis system 110 may be configured to receive user-defined ontologies, for example from user device 120 or another system. Analysis system 110 may be configured to process this ontology, as described herein. In some aspects, system 100 may use this user-defined ontology when determining semantic distances for this user, but not other users. In various aspects, system 100 may use this user-defined ontology when determining semantic distances for all users of system 100. In some aspects, the user that provides the ontology may indicate whether this user-defined ontology should be restricted to that user, or shared with multiples users.

System 100 may be configured to update the received ontologies in step 403, consistent with disclosed embodiments. In some embodiments, analysis system 110 may be configured to update the received ontologies. In some aspects, updating the received ontologies may comprise removing at least one ontological datum and all superiors to the at least one removed ontological datum. In some embodiments, removing an ontological datum may comprise modifying an ontology stored in a memory. In various embodiments, removing an ontological datum may comprise creating one or more resultant ontologies that lack the removed ontology. The one or more resultant ontologies may be stored in a memory. In various embodiments, removing an ontological datum may comprise disregarding the removed ontological datum when calculating semantic distances, without modifying an ontology stored in memory or creating another ontology.

As a non-limiting example, given ontology 210, system 100 may be configured to remove ontological datum 217, making ontological datum 215 the new root ontological datum of ontology 210. As an additional non-limiting example, system 100 may be configured to remove ontological datum 215, and to remove ontological datum 217, a superior to ontological datum 215. This may transform ontology 210 into three updated ontologies. Ontological datum 211 may be the root of one of these three updated ontologies. Ontological data 218 may be the roots of the remaining updated ontologies. As described above, these updates may be implemented by modifying ontology 210 in memory 301, creating at least one new ontology in memory 301, or another memory, or disregarding the removed ontological data when calculating semantic distances.

System 100 may be configured to receive equivalences between ontological data in step 405, consistent with disclosed embodiments. In some aspects, user device 120 may be configured to receive equivalences between ontological data from user 120a. In various aspects, analysis system 110 may be configured to receive such equivalences. For example, analysis system 110 may be configured to receive such equivalences from user device 120, or from another system. As described above with regard to FIG. 2, equivalences may indicate a semantic distance between ontological data. For example, an equivalence may indicate a certain semantic distance between a first ontological datum and a second ontological datum. As an additional example, an equivalence may indicate a predetermined semantic distance, such as a default semantic distance. The predetermined semantic distance may be zero.

Analysis system 110 may be configured to store the received equivalences in semantic distances 303. As a non-limiting example, when semantic distances 303 include tuples, analysis system 110 may be configured to update or create a tuple for the first and second indicated ontological data. The semantic distance for this updated or new tuple may be based on the indicated semantic distance. For example, when the indicated semantic distance is zero, analysis system 110 may be configured to create a tuple comprising the first ontological datum, a second ontological datum, and a semantic distance of zero. As a further non-limiting example, when semantic distances 303 comprise a matrix with rows and columns corresponding to ontological data, analysis system 110 may be configured to modify the value of the element corresponding to the first ontological datum and the second ontological datum based on the indicated semantic distance. For example, when the indicated semantic distance is zero, analysis system 110 may be configured to set to zero the value of this element. One of skill in the art would recognize other possibilities, and the above examples are not intended to be limiting.

System 100 may be configured to calculate semantic distances in step 407, consistent with disclosed embodiments. In some aspects, analysis system 110 may be configured to calculate semantic distances. Analysis system 110 may be configured to calculate the semantic distances using the received equivalences and the updated ontologies. For example, analysis system 110 may be configured to determine a semantic distance between a first ontological datum (e.g., ontological datum 213) in a first ontology (e.g., ontology 210) and a second ontological datum (e.g., ontological datum 223) in a second ontology (e.g., ontology 220).

System 100 may be configured to output semantic distances in step 409, consistent with disclosed embodiments. In some embodiments, outputting the semantic distances may comprise at least one of displaying and/or printing, storing, or providing at least a portion of the semantic distances by analysis system 110. In certain aspects, analysis system 110 may be configured to store at least a portion of the semantic distances in a non-transitory memory (e.g., memory 301). In various aspects, analysis system 110 may be configured to provide the semantic distances to one or more other components of system 100, or to another system. For example, analysis system 110 may be configured to provide at least a portion of the semantic distances to user device 120. User device 120 may be configured to perform at least one of displaying and/or printing, storing, or providing at least a portion of the semantic distances. As would be recognized by one of skill in the art, displaying and printing may encompass a range of visual presentation methodologies, and the disclosed subject matter is not intended to be limited to a particular method.

Figure 5:
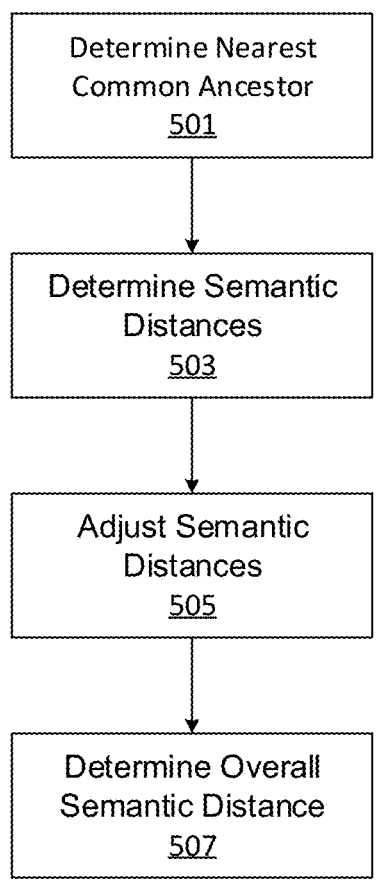
FIG. 5 depicts a flowchart of a method for calculating semantic distances between ontological data, according to an embodiment of the invention.

FIG. 5 depicts an exemplary flowchart of a method for calculating semantic distances between ontological data, consistent with disclosed embodiments. In some aspects, analysis system 110 may be configured to determine nearest common ancestors for a first ontological datum and a second ontological datum, determine semantic distances between the ontological data and the nearest common ancestors, adjust the semantic distances, and determine an overall semantic distance.

Analysis system 110 may be configured to determine nearest common ancestors for the first ontological datum and the second ontological datum in step 501. In some embodiments, the nearest common ancestors may include an ontological datum in the first ontology and an ontological datum in the second ontology. The ontological datum in the first ontology may be superior to the first ontological datum. The ontological datum in the second ontology may be superior to the second ontological datum. The nearest common ancestors may be separated by a known semantic distance. In some embodiments, this known semantic distance may be predetermined. For example, analysis system 110 may have received an equivalence specifying this semantic distance. In various embodiments, analysis system 110 may have determined this known semantic distance using previously determined semantic distances. Analysis system 110 may be configured to determine the nearest common ancestors by searching the first ontology and the second ontology according to methods known in the art.

Analysis system 110 may be configured to determine semantic distances between the ontological data and the nearest common ancestors in step 503, consistent with disclosed embodiments. In some aspects, analysis system 110 may be configured to determine semantic distances using depths of the ontological data.

As a non-limiting example, analysis system 110 may be configured to determine semantic distances according to the method disclosed in "Representation and Construction of Ontologies for Web Intelligence" by Li et al. (Proceedings of the IEEE/WIC Int'l Conf. Web Intelligence, 2003), incorporated herein by reference. As described in Li, the distance between ontological datum y and ontological datum x may be determined as $$D_i(y, x) = \frac{A}{K^{depth_y}} - \frac{A}{K^{depth_x}},$$

where $depth_y$ is the depth of ontological datum y and $depth_x$ is the depth of ontological datum x (e.g., the number of ontological data from the root of the updated ontology to ontological datum y or ontological datum x). In some aspects, analysis system 110 may be configured to store parameters a and k in memory 301. Parameter A may take values ranging from 0 to 10, or from 3 to 8, for example the value 5. This can be related to the density of the ontology. Parameter K may take values ranging from 1 to 17, or from 5 to 12, for example the value 8. This can be related to the depth of the ontology.

The operations can include precomputing mappings of similarity between all terms in the first ontology and all terms in the second ontology by a function that relates depth and density of the first and the second ontologies. The precomputed mappings can include semantic distances between each of the terms of the first and second ontologies.

Figure 9:
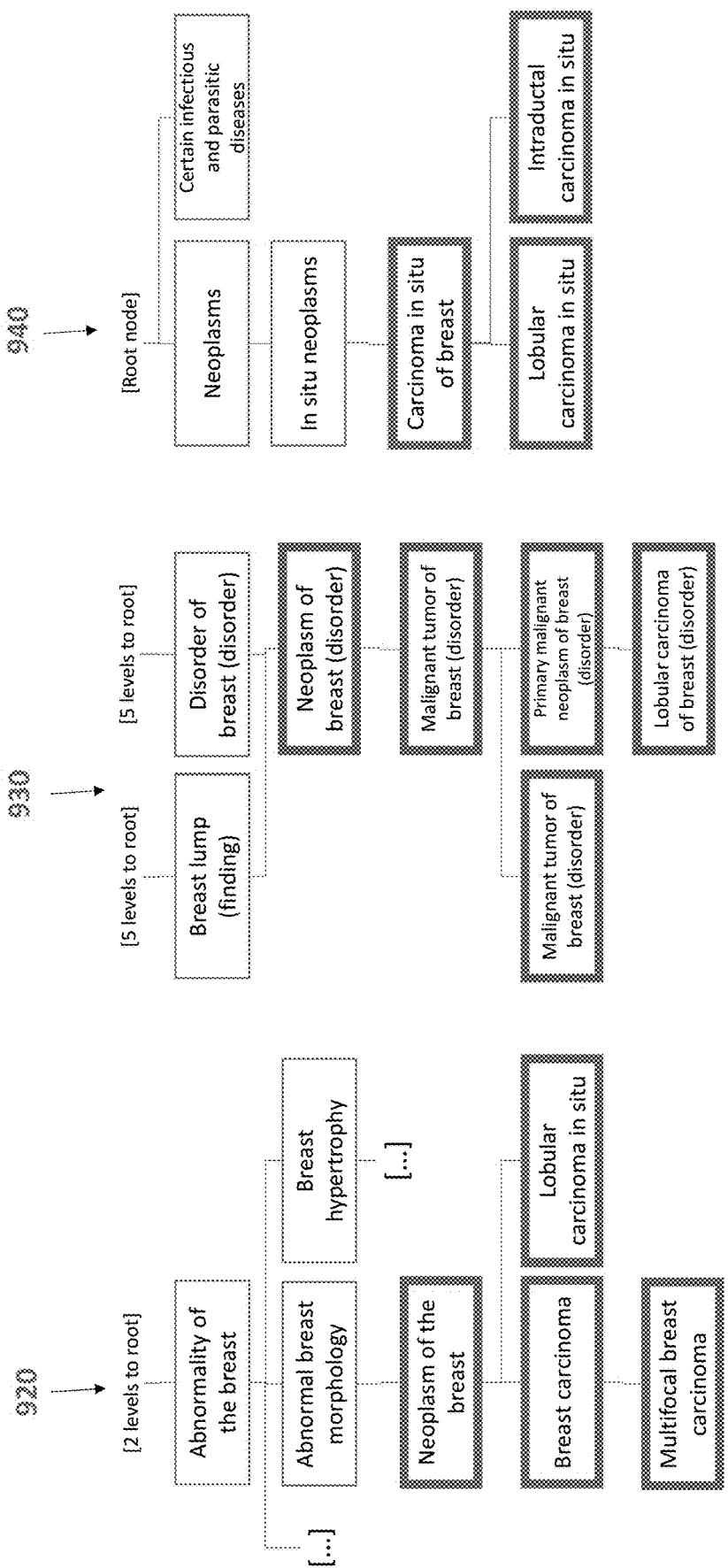
FIG. 9 depicts an example ontological system, according to an embodiment of the invention.

Embodiments of the invention can overcome a technical need of users with large data sets using different terminologies and vocabularies, and to streamline computational resources for efficient lookup calls. FIG. 9 shows an example of how the process can be implemented using three ontologies. For example, in a first ontology HPO, shown as 920 in FIG. 9, when a user searches for the query "Breast cancer", the HPO ontology 920 can be searched. Based on the semantic distance of the term "breast cancer" on the first ontology HPO, the term "neoplasm of the breast" satisfies the predetermined semantic distance. In this case, the predetermined semantic distance of a maximum distance is included in the query as the second input parameter. Because the term "neoplasm of the breast" was returned, the terms that fell underneath this term also satisfied the predetermined semantic distance. At the same time, the query "breast cancer" searched across the second ontology SNOMED, shown as 930 in FIG. 9, which can return different terms. For example, the highest match that satisfies the semantic distance criterion hierarchically is "Neoplasm of breast (disorder)". After that, all the terms underneath are also included as satisfying the semantic distance criterion. Finally, when third ontology of FIG. 9, ICD-10, shown as 940, is queried using the term "Breast cancer," the term "Carcinoma in situ of breast" can satisfy the semantic distance criterion. Each of the children nodes of this term also satisfy the semantic distance criterion. Thus, through this implementation across various ontologies, a much greater return of results is possible with a singularly precomputed mapping of all possible terms within the ontologies.

Some of these efficiency gains can be shown through an example searching through the HPO, UMLS, and SNOMED databases. In an example, HPO terms were mapped to SNOMED terms using prior techniques for a total of 2,805 mappings. HPO and SNOMED in some embodiments have a small overlap because SNOMED can include disease-only terms while HPO can include any human phenotype. This can represent 16.70% mappings. Thus, a disadvantage to the prior art searching is that over 80% of terms are uncorrelated to another database. Making use of the cross-ontology distances, such as in this example of using an intermediary database UMLS, the number of mappings can increase to 7245, representing 28.20%. This can thus represent a substantial increase in the number of mappings and related terms, especially when six different ontologies are used.

The mappings can take place from external sources, which have different cadences of updates. HPO could be daily, UMLS is twice a year. We would run the mapping whenever there is an update. So it can be updated every new time we ingest. Thus, it does not have to be precomputed upon every time a query is executed, saving computational resources. This is especially the case when there are 600,000 terms that are in the databases.

The operations can include calculating in real-time all terms in the first and second ontologies that fall within a predetermined semantic distance criterion of the query term. The operations can include outputting the calculated terms of the first and second ontologies that fall within the predetermined semantic distance criterion. As an additional non-limiting example, analysis system 110 may be configured to determine semantic distances as $D_i(x,y)=depth_y-depth_x$, where $depth_y$ is the depth of ontological datum y and $depth_x$ is the depth of ontological datum x, as described above. As a further non-limiting example, analysis system 110 may be configured to determine semantic distances as $D_i(x,y)=(depth_y-depth_x)/depth_x$. Thus, the semantic distance between ontological datum y and ontological datum x may be normalized by the depth of ontological datum x.

Analysis system 110 may be configured to adjust the semantic distances in step 505, consistent with disclosed embodiments. In some embodiments, analysis system 110 may be configured to adjust the semantic distances based on positions of ontological data within an ontology. In some aspects, analysis system 110 may be configured to attribute greater semantic distances to separations between ontological data closer to the root of the ontology than separations between ontological data further from the root of the ontology. As a non-limiting example, analysis system 110 may be configured to attribute a greater semantic distance to the separation between ontological datum 215 and ontological datum 217 than to the separation between ontological datum 215 and ontological datum 211.

In some embodiments, analysis system 110 may be configured to determine semantic distances based on characteristics of ontological data. These characteristics may include a classification, rank, level, or similar distinguishing characteristic. For example, an ontology may include sibling ranks for ontological data. Thus, the subordinates of an ontological datum at the same level of the ontology (i.e. siblings) may have sibling ranks (e.g., as in SNOWMED CT). Analysis system 110 may be configured to determine different semantic distances between the ontological datum and each subordinate, depending on these sibling ranks. As a non-limiting example, when the sibling rank of ontological datum 211 differs from the sibling ranks of ontological data 218, analysis system 110 may be configured to determine different semantic distances between ontological datum 215 and ontological datum 211, and between ontological datum 215 and ontological data 218.

In some embodiments, analysis system 110 may be configured to determine semantic distances based on characteristics of an ontology. For example, as described above with regard to FIG. 3, analysis system 110 may be configured to store normalization factors. A normalization factor associated with an ontology may depend on characteristics of the ontology. In some embodiments, a normalization factor may depend on at least one depth of at least one ontological datum in the ontology. As described above, such a depth may comprise the number of nodes between a root of the updated ontology and an ontological datum of the updated ontology. This ontological datum may be a leaf of the updated ontology. In some aspects, a normalization factor may depend on an average depth of the leaves of the associated updated ontology. In some various aspects, the normalization factor may be a function of the average depths of the leaves of the associated updated ontology. As a non-limiting example, the function may be a reciprocal, or an exponentiation. In some aspects, the normalization factor may depend on a maximum depth of the leaves of the associated updated ontology. For example, the normalization factor may be a function of a value equal to half the maximum depth of the leaves of the associated updated ontology. As a non-limiting example, the function may be a reciprocal, or an exponentiation. In some aspects, the value of the normalization factor may be between 1 and 25, or between 8 and 20.

As a non-limiting example, analysis system 110 may be configured to determine an adjusted semantic distance as $D_f(x,y)=w(x,y)*D_i(x,y)*NF$, where x and y are ontological data in an ontology, $D_i(x,y)$ is an unadjusted semantic distance between x and y, $w(x,y)$ is a weight based on characteristics of at least one of x and y, NF is a normalization factor based on the ontology, and $D_f(x,y)$ is the adjusted semantic distance. As would be appreciated by one of skill in the art, other formulations are possible and the above formulation is not intended to be limiting. In some aspects, at least one of the weight and normalization factor may not be used to calculate the adjusted semantic distance, or may be set to one.

In some embodiments, the weight $w(x,y)$ may be based on a rank. For example, where ontological datum y is a subordinate to ontological datum x (e.g., as ontological datum 211 is a subordinate to ontological datum 215), the weight $w(x,y)$ may be based on a sibling rank of ontological datum y. In some embodiments, analysis system 110 may be configured to determine semantic distances as follows:

$$w = \left(\frac{e^{-depth_x}}{1+e^{-rank_y}}\right) + 1$$

Where $depth_x$ may be the depth of ontological datum x in the ontology (e.g., the number of ontological data from the root of the updated ontology to ontological datum x), and $rank_y$ may be a rank of ontological datum y, such as a sibling rank. Thus, the significance of the weight decreases with increasing depth into the ontology, and increases with increasing rank of the ontological element. In this manner, analysis system 110 may be configured to distinguish between ranked ontological data with otherwise identical semantic distances.

Analysis system 110 may be configured to determine an overall semantic distance in step 507, consistent with disclosed embodiments. In some aspects, this overall semantic distance may depend on the first semantic distance, the second semantic distance, and the semantic distance between the nearest common ancestors. For example, analysis system 110 may be configured to determine the overall semantic distance as follows:

$$D_T(x,y)=D_f(x,LCA_x)+D_f(y,LCA_y)+D_f(LCA_x,LCA_y)$$

Where $D_T(x,y)$ is the overall semantic distance, $D_f(x,LCA_x)$ is the semantic distance between ontological datum x in the first ontology and the nearest common ancestor in the first ontology $LCA_x$, $D_f(y,LCA_y)$ is the semantic distance between ontological datum y in the second ontology and the nearest common ancestor in the second ontology $LCA_y$, and $D_f(LCA_x,LCA_y)$ is the semantic distance between $LCA_x$ and $LCA_y$. As described above with regard to step 501, analysis system 110 may have received equivalences specifying $D_f(LCA_x,LCA_y)$ or may have previously determined $D_f(LCA_x,LCA_y)$.

For example, as shown in FIG. 2, ontological datum 211 and ontological datum 221 may be the nearest common ancestors of ontological datum 213 and ontological datum 223. The overall semantic distance between ontological datum 213 and ontological datum 223 may comprise the sum of the semantic distance between ontological datum 213 and ontological datum 211, the semantic distance between ontological datum 223 and ontological datum 221, and the semantic distance between ontological datum 211 and ontological datum 221. In some aspects, analysis system 110 may have received an equivalence specifying the semantic distance between ontological datum 211 and ontological datum 221. For example, the received equivalence may specify a semantic difference of zero between ontological datum 211 and ontological datum 221. In various aspects, analysis system 110 may have previously determined a semantic difference between ontological datum 211 and ontological datum 221. For example, analysis system 110 may have previously determined this semantic difference using a received equivalence between ontological datum 215 and ontological datum 221.

Figure 6:
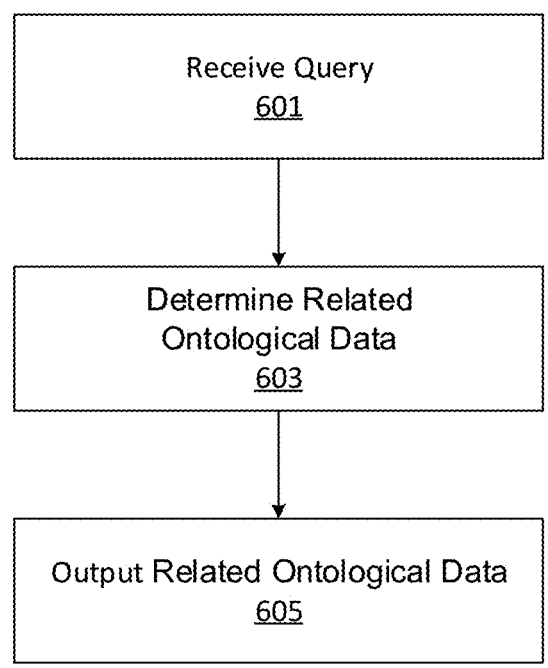
FIG. 6 depicts a flowchart of a method for determining related ontological data using semantic distances, according to an embodiment of the invention.

FIG. 6 depicts an exemplary flowchart of a method for determining related ontological data using semantic distances, consistent with disclosed embodiments. Analysis system 110 may be configured to receive a query in step 601, consistent with disclosed embodiments. In some aspects, analysis system 110 may be configured to receive the query from user device 120, or another system. The query may indicate an ontological datum. The query may also indicate a semantic distance criterion, as described above with regards to FIG. 3. In some aspects, the semantic distance criterion may specify a degree of semantic similarity. This degree of semantic similarity may be expressed as a dimensionless number. In some aspects, this dimensionless number may range from 0 to 80, or 0 to 50, depending on the parameters of the ontologies being used. For example, an ontology having a greater depth and/or a greater density of leaf nodes could have greater possible semantic distances, and thus a greater range. A semantic distance criterion with a value of zero may only be satisfied by equivalent ontological data. As a non-limiting example, a query may indicate ontological datum 211 and a semantic distance criterion with a zero degree of semantic similarity. When equivalence 230 indicates a semantic distance of zero between ontological datum 211 and ontological datum 221, this exemplary query may be satisfied by ontological datum 221. In some embodiments, the query may indicate ontologies to search, or ontologies to exclude from searching. For example, the query may indicate an ontological datum within ontology 210, and may also indicate that ontology 220 should be considered for related ontological data.

The dimensionless degree of semantic similarity may be normalized to standardize distances across different ontologies. So for example, a semantic distance of two terms could be 30 between two ontologies having a range of 50. Since a range of different ontologies could be greater depending on the depth and density (e.g., 0-80), a distance of those same terms between the two different ontologies could be different (e.g., 48) on this scale. However, these different values can be normalized according to a standardized range of, for example, 0-1. With such a normalization, the different values can be adjusted to be more similar based on the score in relation to its range. For example, 30/50 could be 0.6 whereas 48/80 can similarly be 0.6. Thus, everything up to a distance of 20 and that value should be that same limit across all pair-wise comparisons of ontologies.

At least two aspects of ranking can be contemplated within the broad inventive principles disclosed herein. First, a query can include a concept, such as a disease name, which can be compared to another concept, such as another disease name Later on, sets of diseases can be compared with other sets of diseases. A patient can have multiple diseases or phenotypes that can be compared against other patients having other sets of diseases or phenotypes. This could be on the order of 10-20 different phenotypes per patient. This can thus include sorting or distance measuring for patients as well as sorting or ranking individual diseases.

Figure 10:
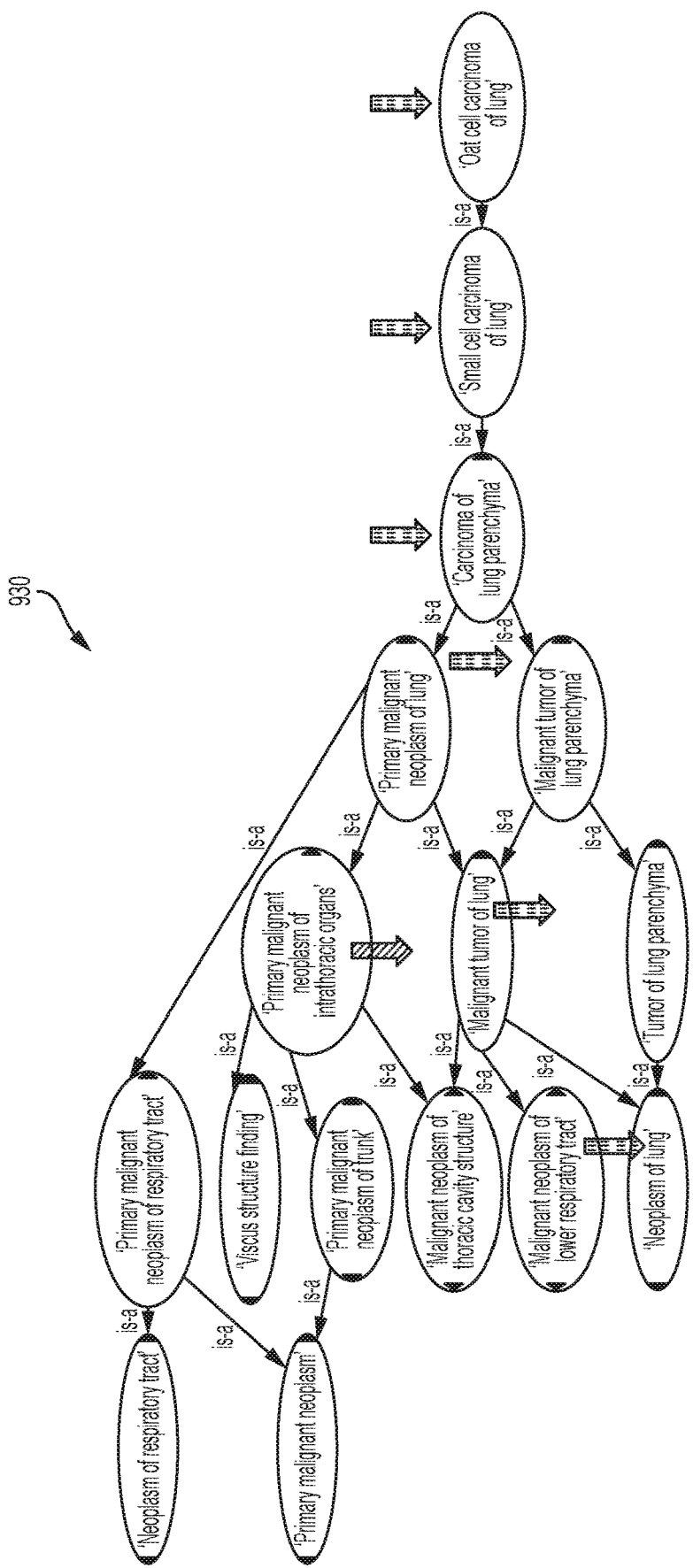
FIG. 10 depicts an integrated ontology, according to an embodiment of the invention.

FIG. 10 shows an integrated database according to embodiments of the invention. Specifically, the figure shows a streamlined intra-ontology concept navigation (Integrated SNOMED CTV3 Navigation Reference Set (RefSet)).

Figure 11:
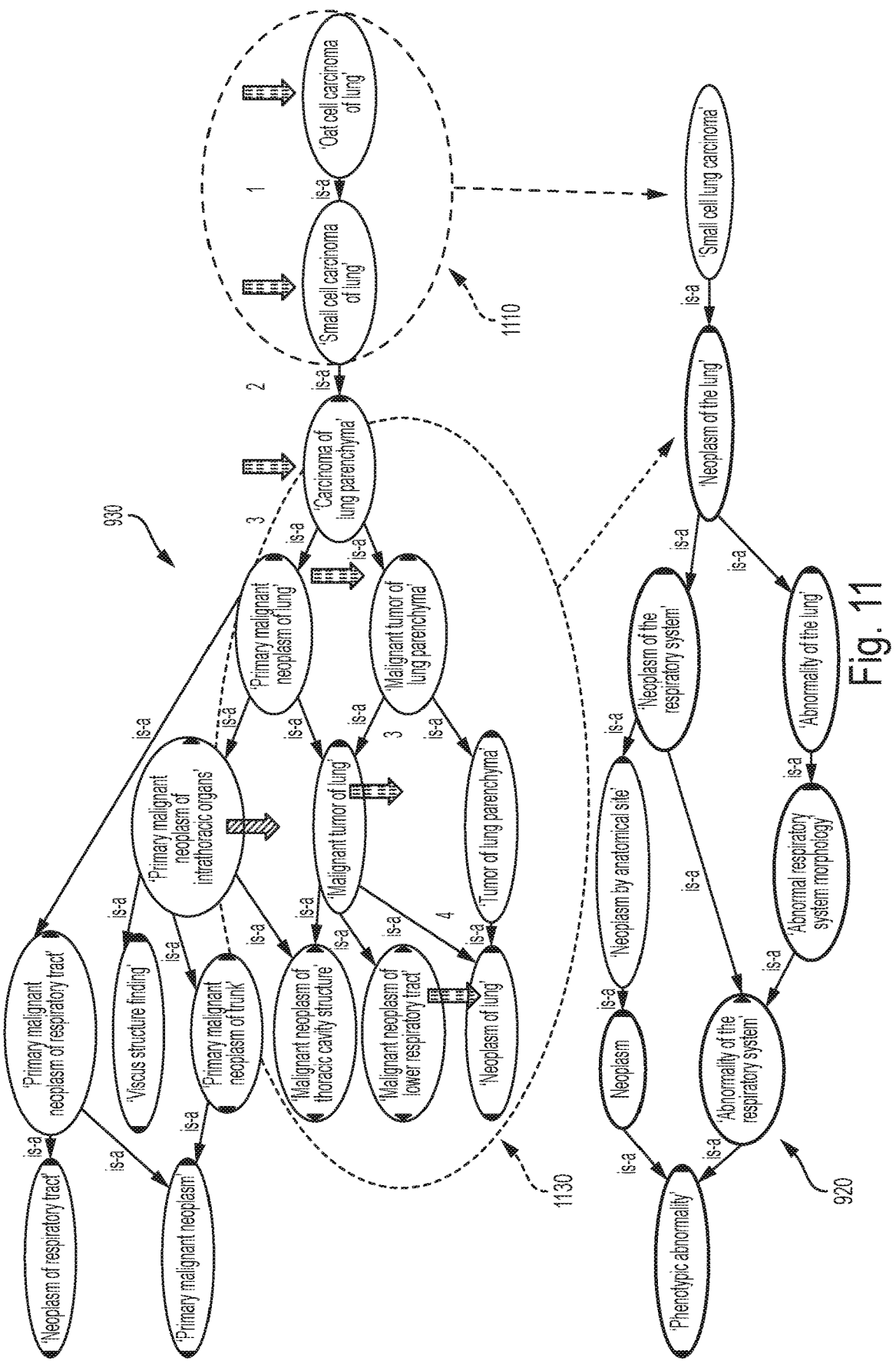
FIG. 11 depicts mappings of ontologies, according to an embodiment of the invention.

FIG. 11 shows improving Cross-Ontology Mapping with RefSet. Specifically, FIG. 11 shows the ontology of FIG. 10, SNOMED, 930 getting mapped to HPO Ontology 920 using string matches as well as using associations used by other databases, such as UMLS. As an example, the term "neoplasm of lung (disorder)" of the SNOMED ontology 930 could be mapped to "Neoplasm of the lung" of the HPO ontology 920 through, for example, a mapsource intermediary ontology UMLS, represented in 1130, that overlaps with HPO 920 and SNOMED 930 ontologies. As another example, the term "Oat cell carcinoma of lung (disorder)" can be mapped to "Small cell lung carcinoma" using a string match 1110 of related terms in the HPO and SNOMED terms, according to flexible string searches known to one skilled in the art. FIG. 11 shows in darker shades the terms that would satisfy a matching or a predetermined semantic distance based on similarity of the terms.

Figure 12:
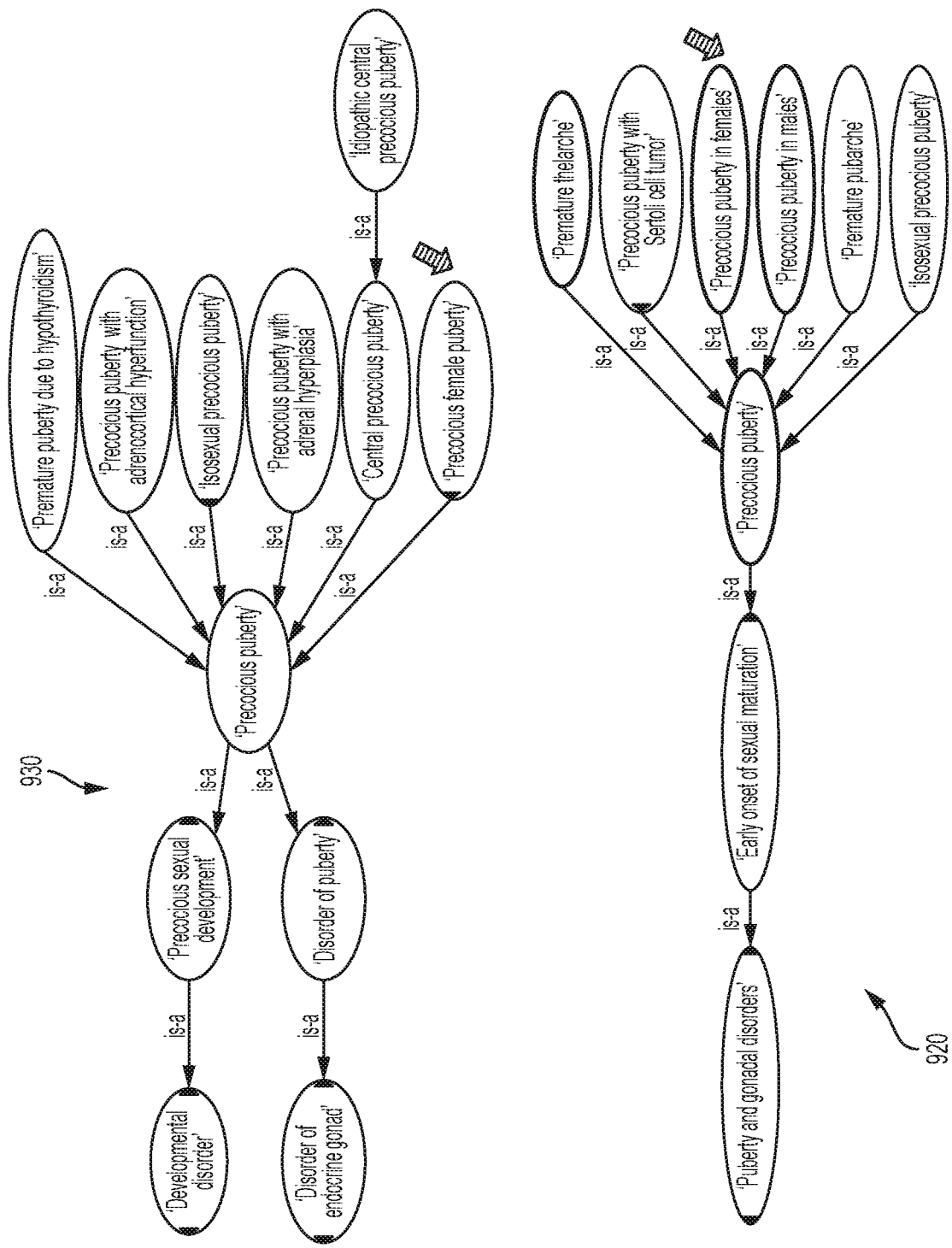
FIG. 12 depicts a lexical match, according to an embodiment of the invention.

As an example of a lexical search, FIG. 12 shows in darker shades the terms that would satisfy a matching or a predetermined semantic distance based on similarity of the terms. For example, the term "Precocious puberty," as in SNOMED 930, can be mapped to terms in other databases, such as HPO 920. The terms that satisfy the predetermined criteria can be shown in orange.

Analysis system 110 may be configured to determine ontological data related to indicated ontological data in step 603, consistent with disclosed embodiments. In some aspects, related ontological data may include ontological data satisfying the semantic distance criterion. This related ontological data may include ontological data from the same ontology as the ontological datum indicated in the query, and may include ontological data from other ontologies. In some embodiments, analysis system 110 may be configured to access a database of predetermined semantic distances (e.g., semantic distances 303) and retrieve semantic distances for ontological data. Analysis system 110 may be configured to determine whether these semantic distances satisfy the semantic distance criterion. For example, when the semantic distance criterion is a number, analysis system 110 may be configured to determine whether the retrieved semantic distances are less than or equal to the number. In some embodiments, analysis system 110 may have previously determined the semantic distances according to the systems and methods disclosed with regard to FIGS. 4 and 5. As an additional example, in some embodiments, analysis system 110 may be configured to calculate the semantic distances in response to the query.

System 100 may be configured to output related ontological data in step 605, consistent with disclosed embodiments. In some embodiments, outputting the related ontological data may comprise at least one of displaying and/or printing, storing, or providing at least a portion of the related ontological data by analysis system 110 in response to the query in step 601. In certain aspects, analysis system 110 may be configured to store at least a portion of the related ontological data in a non-transitory memory (e.g., memory 301). In various aspects, analysis system 110 may be configured to provide the related ontological data to one or more other components of system 100, or to another system. For example, analysis system 110 may be configured to provide at least some of the related ontological data to user device 120. Analysis system 110 may be configured to also provide rankings for the provided ontological data. These ranking may be relative (e.g., a relatedness index), or absolute. As a non-limiting example of an absolute ranking, analysis system 110 may be configured to provide the semantic distance between the ontological datum indicated in the query and each provided ontological datum. Thus, absolute ranking can include querying that does not impact ranking of (pre-computed and/or returned) results. User device 120 may be configured to perform at least one of displaying and/or printing, storing, or providing at least a portion of the related ontological data. As would be recognized by one of skill in the art, displaying and printing may encompass a range of visual presentation methodologies, and the disclosed subject matter is not intended to be limited to a particular method. A relative relatedness index can be specific to the incoming query. So results can be sorted and ranked depending on a user's query, for example, in real-time.

Figure 7A:
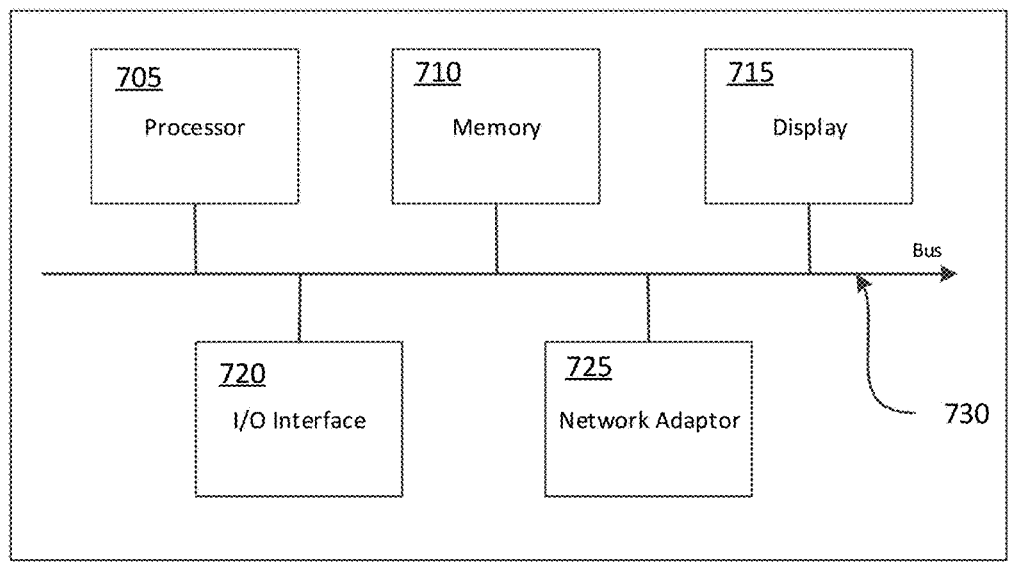
FIG. 7A depicts a computing system suitable for implementing disclosed systems and methods, according to an embodiment of the invention.

FIG. 7A depicts a schematic of an exemplary computing device 700 for implementing the disclosed embodiments. The components of system 100, such as user device 120 and analysis system 110, may generally be implemented as one or more of computing device 700. According to some embodiments, the exemplary computing device 700 may include a processor 705, memory 710, display 715, I/O interface(s) 720, and network adapter 725. These units may communicate with each other via bus 730, or wirelessly. The components shown in FIG. 7A may reside in a single device or multiple devices.

Processor 705 may be one or more microprocessors, central processing units, or graphics processing units performing various methods in accordance with disclosed embodiments. These processing units may include one or more cores. Memory 710 may include one or more computer hard disks, random access memory, removable storage, or remote computer storage. In various embodiments, memory 710 stores various software programs executed by processor 705. Display 715 may be any device which provides a visual output, for example, a computer monitor, an LCD screen, etc. I/O interfaces 720 may include a keyboard, a mouse, an audio input device, a touch screen, or similar human interface device. Network adapter 725 may include hardware and/or a combination of hardware and software for enabling computing device 700 to exchange information with external networks. For example, network adapter 725 may include a wireless wide area network (WWAN) adapter, a Bluetooth module, a near field communication module, or a local area network (LAN) adapter.

Figure 7B:
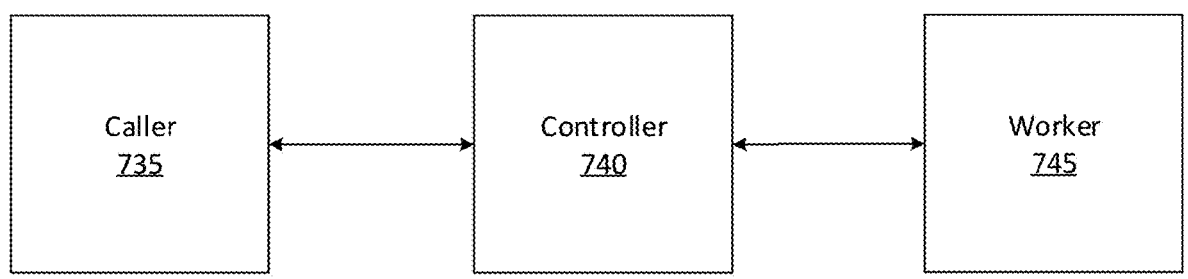
FIG. 7B depicts a computing system suitable for implementing disclosed systems and methods, according to an embodiment of the invention.

FIG. 7B depicts a schematic of an exemplary system for distributed computation of significance values, consistent with disclosed embodiments. In such embodiments, system 100 may be implemented using a parallel computing architecture. This parallel computing architecture may be implemented using one or more computing devices as described according to FIG. 7A. In such an architecture (e.g., Hadoop or the like), one or more components of system 100 may comprise controller 740 and workers 745. Caller 735 may comprise a component of system 100 that requests a computational result using this parallel computing architecture. In some embodiments, caller 735 may be configured to communicate with controller 740, or another element of the parallel computing architecture, to request the computational result. Controller 740 may comprise one or more nodes of the parallel computing cluster configured with data and instructions for managing performance of the distributed computation. Controller 740 may be configured to assign nodes of the parallel computing cluster as workers 745. Workers 745 may include one or more nodes of the parallel computing cluster configured with data and instructions for performing distributed computations. Workers 745 may include mappers and reducers. The mappers may be configured to group data elements, such as observational values, for aggregation by the reducers. The reducers may be configured to compute aggregate results for each group of mapped data elements. Controller 740 may be configured to assign worker nodes as mappers and reducers. Controller 740 may also be configured to track the status of workers 745, assigning and reassigning tasks (such as mapping and reduction) to worker nodes as needed. Controller 740 may further be configured to provide the result of the distributed computation to caller 735. As would be recognized by one of skill in the art, other parallel computing implementations are possible and the above disclosure is not intended to be limiting.

Example: Expanding Search Results

Figure 8:
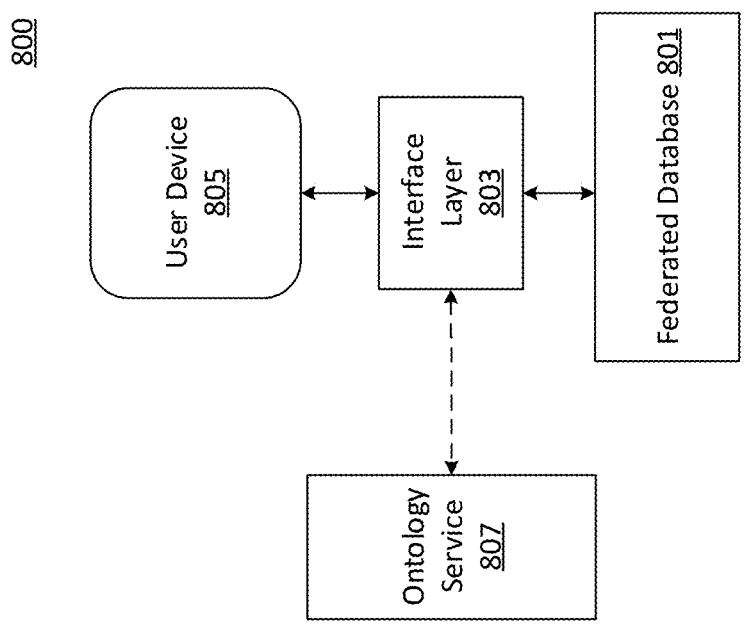
FIG. 8 depicts a schematic of a system for searching data stored in a federated database using ontologies, according to an embodiment of the invention.

FIG. 8 depicts the application of the systems and methods disclosed above to a system for retrieving results stored in a federated database system 801 (of system 800), as disclosed in U.S. Provisional Application 62/378,675, filed Aug. 23, 2016, the content of which is hereby incorporated by reference herein in its entirety. In some embodiments, the system may comprise a federated database 801, an interface layer 803, a user device 805, and an ontology service 807. Users of system 800 may query the database for relevant search results, but may also add items to the federated database. As there is no central authority imposing a consistent nomenclature, users may be unable to find relevant data, because they do not know the correct search term. The ontology service, using the disclosed systems and methods, addresses this technical problem in federated database management, improving the operation of system 800 by enabling users to more accurately retrieve relevant search results.

The components of system 800 may be configured to communicate over a network. This network may be any type of network (including infrastructure) that provides communications, exchanges information, and/or facilitates the exchange of information, such as the Internet, a Local Area Network, or other suitable connection(s) that enables system 800 to send and receive information between the components of system 800, between the components of system 800 and other systems, and between system 800 and other systems. System 800 may be implemented as a web service, and may be implemented in accordance with representational state transfer (RESTful) principles. In various aspects, system 800 may be configured to pass data between the components of system 800 as data objects, using formats such as JSON, XML, and YAML. System 800 may be configured to expose application program interfaces (APIs) for communicating between system components. In some aspects, these APIs may be generated using an API description language such as Swagger, WSDL2.0, and/or WADL.

Interface layer 803 may comprise one or more programs managing interactions between the user device 805, the ontology service 807, and the federated database 801. Interface layer 803 may be configured to translate between protocols used by components of system 800. Interface layer 803 may be configured to automatically convert requests received from another component of system 800 into one or more additional requests. For example, interface layer 803 may be configured to convert a request for information received from user device 805 into multiple requests directed to multiple components of system 800. In this manner, interface layer 803 may coordinate the operation of the ontology service 807 and the federated database system 801 to retrieve the requested results.

User device 805 may comprise a computing system configured to communicate with the other components of system 800, or another system. User device 805 may be configured to exchange data or instructions with the federated database 801 by interaction with interface layer 805, or another component of system 800. User device 805 may include, but is not limited to, one or more servers, workstations, desktops, or mobile computing devices (e.g., laptops, tablets, phablets, or smart phones). In some embodiments, user device 805 may be configured to enable interaction with a user. In some aspects, user device 805 may provide a graphical user interface for displaying information. The displayed information may be received by user device 805, or may be generated by user device 805. For example, the displayed information may include medical data, such as medical data retrieved from federated database 801.

Ontology service 807 may be configured to determine search terms using stored ontologies. Non-limiting examples of ontologies are described above. Ontology service 807 may be configured to determine semantic distances between a first term in a first ontology, and other terms in that same ontology and other ontologies, as described above.

System 800 may be configured to receive a request for data items, consistent with disclosed embodiments. In some embodiments, the request may be received from user device 805, or another system. The request may indicate a search term. For example, the request may indicate all predictive associations associated with a particular genetic variant. As a further example, the request may indicate all clinical indicators associated with pharmacokinetic effects for a particular drug, or associated with a prognosis for a particular disease.

System 800 may be configured to provide the request to interface layer 805, consistent with disclosed embodiments. In some aspects, interface layer 803 may be configured to handle tasks associated with fulfilling the request. For example, interface layer 803 may be configured to construct multiple secondary requests, based on the received request, and provide these secondary requests to other components of system 800. Interface layer 803 may be configured to provide these requests to other components in a particular order, which may be predetermined or may depend on the request. In some embodiments, interface layer 803 may be configured to authenticate user device 805.

In some embodiments, interface layer 805 may be configured to optionally provide a secondary request to ontological service 807. In some aspects, this secondary request may include indications of the requested search term. For example, the secondary request may include a variant identifier, a disease name, a drug, or similar information. Based on the received indication, stored ontologies, a semantic distance criterion, and between-ontology differences between the stored ontologies, ontological service 807 may be configured to generate additional search terms. In some embodiments, at least one of the semantic distance criterion and the between-ontology differences may be predetermined. In various embodiments, at least one of the semantic distance criterion and the between-ontology differences may be determined based on at least one of the user, an indication received from user device 120, the search term, and the stored ontologies. For example, the user may interact with a graphical user interface of the user device 120 to select a semantic distance criterion. As an additional example, a user may adjust the semantic distance criterion by adjusting a control to specify a threshold semantic distance value. This control may be a knob, a spinner, a slider, or another similar control.

As described above, ontological service 807 may be configured to use equivalences defined between ontologies to determine semantic distances across ontologies. For example, ontological service 807 may be configured with a first corresponding disease in the first ontology and a second corresponding disease in the second ontology. Ontological service 807 may be configured to determine an overall semantic distance based on a first semantic distance in the first ontology, a second semantic distance in the second ontology, and the between-ontology semantic distance between the first ontology and the second ontology.

For example, the ontological service 807 may receive a disease name, such as "breast cancer," and the semantic distance criterion. Using the stored ontologies, ontological service 807 may be configured to determine additional diseases that satisfy the semantic distance criterion based on a semantic distance between, in this example, "breast cancer" and the additional disease. A first ontology may contain "breast cancer" and a second ontology may contain "invasive lobular carcinoma" and "angiosarcoma." The first semantic distance may comprise a semantic distance from "breast cancer" to the first corresponding disease in the first ontology. The second semantic distance may comprise a semantic distance from "invasive lobular carcinoma" (or "angiosarcoma") to the second corresponding disease in the second ontology. In this manner, ontological service 807 may be configured to determine that "invasive lobular carcinoma" and "angiosarcoma" are within the specified semantic distance of "breast cancer," while "gunshot wound" is not.

Ontological service 807 may be configured to provide indications of the additional diseases to interface layer 803. In this manner, system 100 may be configured to generate an expanded set of search terms for the federated database. Interface layer 803 may be configured to provide a request for results matching the search terms to federated database 801, consistent with disclosed embodiments. In response, federated database 801 may provide results for all of the search terms, not just the search term provided in the original request from user device 805. In this manner, a user may be able to receive more complete search results, without having to know all of the search terms used by the databases in federated database 801. In this manner, the disclosed systems and methods provide a technical solution to a technical problem in the field of federated database management, and improve the operation of the disclosed computing devices.

The foregoing disclosed embodiments have been presented for purposes of illustration only. This disclosure is not exhaustive and does not limit the claimed subject matter to the precise embodiments disclosed. Those skilled in the art will appreciate from the foregoing description that modifications and variations are possible in light of the above teachings or may be acquired from practicing the inventions. In some aspects, methods consistent with disclosed embodiments may exclude disclosed method steps, or may vary the disclosed sequence of method steps or the disclosed degree of separation between method steps. For example, method steps may be omitted, repeated, or combined, as necessary, to achieve the same or similar objectives. In various aspects, non-transitory computer-readable media may store instructions for performing methods consistent with disclosed embodiments that exclude disclosed method steps, or vary the disclosed sequence of method steps or disclosed degree of separation between method steps. For example, non-transitory computer-readable media may store instructions for performing methods consistent with disclosed embodiments that omit, repeat, or combine, as necessary, method steps to achieve the same or similar objectives. In certain aspects, systems need not necessarily include every disclosed part, and may include other undisclosed parts. For example, systems may omit, repeat, or combine, as necessary, parts to achieve the same or similar objectives. Accordingly, the claimed subject matter is not limited to the disclosed embodiments, but instead defined by the appended claims in light of their full scope of equivalents.

What is claimed is:

1. A system for retrieving related ontological data, comprising:
    at least one processor of an analysis system; and
    at least one non-transitory memory of the analysis system, the at least one non-transitory memory storing instructions that, when executed by the at least one processor, cause the analysis system to perform operations comprising:
        providing a first ontology of medical-related data and a second ontology of medical-related data, the first ontology and the second ontology each comprising a plurality of levels of hierarchically organized ontological data;
        precomputing mappings of similarity between all terms in the first ontology and all terms in the second ontology by a function that relates depth and density of the first and the second ontologies, the precomputed mappings comprising semantic distances between each of the terms of the first and second ontologies;
        receiving a query for medical-related ontological data related to ontological data in the first ontology, the query comprising a query term;
        calculating in real-time all terms in the first and second ontologies that fall within a predetermined semantic distance criterion of the query term;
        outputting the calculated terms of the first and second ontologies that fall within the predetermined semantic distance criterion.

2. The system of claim 1, wherein the predetermined semantic distance criterion is a distance equal to or less than a first semantic distance between the query term and at least one ontological datum of the first ontology and is a distance equal to or less than a semantic distance between the query term and at least one ontological datum of the second ontology,
wherein the at least one non-transitory memory further includes instructions that, when executed by at least one processor, cause the analysis system to perform normalizing the first semantic distance of the first ontology by a function of depth and density of the first ontology and normalizing the second semantic distance of the second ontology by a function of depth and density of the second ontology.

3. The system of claim 2, wherein the received query includes the predetermined semantic distance criterion.

4. The system of claim 2, wherein each of the normalized first and second semantic distances are normalized by dividing the semantic distance of each respective ontology by the greatest distance times the total number of leaf nodes of the corresponding ontology.

5. The system of claim 1, wherein calculating all the terms fall within the semantic distance criterion comprises determining a first ontological datum of the first ontology and a second ontological datum of the second ontology as the nearest common ancestors of the third ontological datum and the fourth ontological datum.

6. The system of claim 5, wherein the normalization factor comprises an average depth of the first ontology.

7. The system of claim 1, wherein the second semantic distance depends on a sibling rank of the third ontological datum.

8. A system for determining semantic distances, comprising:
    at least one processor of an analysis system; and
    at least one non-transitory memory of the analysis system, the at least one non-transitory memory containing instructions that, when executed by the at least one processor, cause the analysis system to perform operations comprising:
        receiving a first ontology and a second ontology, the first ontology and the second ontology comprising hierarchically organized ontological data;
        receiving an indication that a first ontological datum in the first ontology is equivalent to a second ontological datum in the second ontology;
        determining a first semantic distance between the first ontological datum and a third ontological datum, the third ontological datum subordinate to the first ontological datum;
        determining a second semantic distance between the second ontological datum and a fourth ontological datum, the fourth ontological datum subordinate to the second ontological datum;
        determining, using the first semantic distance and the second semantic distance, a third semantic distance between the third ontological datum and the fourth ontological datum; and
        outputting the third semantic distance.

9. The system of claim 8, wherein the operations further comprise determining the first ontological datum and the second ontological datum as the nearest common ancestors of the third ontological datum and the fourth ontological datum.

10. The system of claim 9, wherein the operations further comprise updating the first ontology before determining the first semantic distance by removing at least one ontological datum and all superiors to the at least one removed ontological datum.

11. The system of claim 9, wherein the first semantic distance depends on a depth of the third ontological datum.

12. The system of claim 9, wherein the first semantic distance depends on a normalization factor specific to the first ontology.

13. The system of claim 12, wherein the normalization factor comprises an average depth of the first ontology.

14. The system of claim 9, wherein the first semantic distance depends on a sibling rank of the third ontological datum.

15. A non-transitory computer readable medium containing instructions that, when executed by at least one processor of a system, cause the system to perform operations comprising:
- receiving a first ontology and a second ontology, the first ontology and the second ontology comprising hierarchically organized ontological data;
- receiving an indication that a first ontological datum in the first ontology is equivalent to a second ontological datum in the second ontology;
- receiving a query for ontological data related to a third ontological datum in the first ontology, the third ontological datum subordinate to the first ontological datum;
- determining a first semantic distance between the third ontological datum and a fourth ontological datum in the second ontology satisfies a semantic distance criterion, the fourth ontological datum subordinate to the second ontological datum, the first semantic distance depending on:
  - a second semantic distance between the third ontological datum and the first ontological datum, the second semantic distance depending on a depth of the third ontological datum, and
  - a third semantic distance between the fourth ontological datum and the first ontological datum; and
- outputting the fourth ontological datum based on the determination that the first semantic distance satisfies the semantic distance criterion.

16. The non-transitory computer readable medium of claim 15, wherein the query includes the semantic distance criterion.

17. The non-transitory computer readable medium of claim 15, wherein determining the first semantic distance satisfies the semantic distance criterion comprises accessing a database of predetermined semantic distances, retrieving the first semantic distance, and comparing the first semantic distance to the semantic distance criterion.

18. The non-transitory computer readable medium of claim 15, wherein the second semantic distance depends on a normalization factor specific to the first ontology, the normalization factor comprising an average depth of the first ontology.

19. The non-transitory computer readable medium of claim 15, wherein the second semantic distance depends on a sibling rank of the third ontological datum.

20. A system for retrieving results from a federated database, comprising:
- at least one processor; and
- at least one non-transitory memory, the at least one non-transitory memory storing instructions that, when executed by the at least one processor, cause the system to perform operations comprising:
  - receiving a request comprising a first search term from a user device, wherein a first ontology includes the first search term,
  - providing the first search term to a ontological service,
  - receiving, from the ontological service, a second search term satisfying a semantic distance criterion, wherein a second ontology, distinct from the first ontology, includes the second search term,
  - providing the first search term and the second search term to a federated database,
  - receiving a result matching at least one of the first search term and the second search term from the federated database, and
  - providing the result to the user device,
- wherein an overall semantic distance separates the first search term in the first ontology from the second search term in the second ontology, the overall semantic distance satisfying the semantic distance criterion, and
- wherein the overall semantic distance depends on a first semantic distance from the first search term to a first corresponding term in the first ontology, a second semantic distance from the second search term to a second corresponding term in the second ontology, and a between ontology semantic distance between the first corresponding term and the second corresponding term.

21. The system of claim 20, wherein the federated database stores medical data, and the first search term comprises a disease name, gene or genetic variant.

* * * * *